(12) United States Patent
Dumenigo et al.

(10) Patent No.: US 9,656,591 B1
(45) Date of Patent: May 23, 2017

(54) SECURING STRAP HAVING AT LEAST ONE STRAP SECURING INTERFACE

(71) Applicants: Jayson Dumenigo, Canyon Country, CA (US); Joseph Ross, Santa Clarita, CA (US)

(72) Inventors: Jayson Dumenigo, Canyon Country, CA (US); Joseph Ross, Santa Clarita, CA (US)

( * ) Notice: Subject to any disclaimer, the term of this patent is extended or adjusted under 35 U.S.C. 154(b) by 0 days.

(21) Appl. No.: 14/837,923

(22) Filed: Aug. 27, 2015

(51) Int. Cl.
*A44B 11/00* (2006.01)
*B60P 7/08* (2006.01)
*A44B 11/04* (2006.01)
*A44B 11/06* (2006.01)
*A44B 11/16* (2006.01)

(52) U.S. Cl.
CPC .............. *B60P 7/083* (2013.01); *A44B 11/04* (2013.01); *A44B 11/065* (2013.01); *A44B 11/16* (2013.01)

(58) Field of Classification Search
CPC B60P 7/13; B60P 7/0823; B60P 7/083; B60P 7/0846; B65H 54/585; B65H 75/4494; Y10T 24/2175; Y10T 24/2117; Y10T 24/2147; Y10T 24/21
See application file for complete search history.

(56) References Cited

U.S. PATENT DOCUMENTS

| | | | |
|---|---|---|---|
| 3,120,403 A * | 2/1964 | Molzan | B64D 17/383 119/769 |
| 3,672,003 A | 6/1972 | Morgan | |
| 4,155,537 A * | 5/1979 | Bronson | F16G 11/12 24/909 |
| 4,252,158 A | 2/1981 | McDade | |
| 5,063,641 A * | 11/1991 | Chuan | A44B 11/18 24/197 |
| 5,271,606 A | 12/1993 | Kamper | |
| 5,308,101 A * | 5/1994 | Monty | B60D 1/182 267/74 |
| 5,326,202 A * | 7/1994 | Stubbs | B60P 7/0823 24/17 A |
| 5,423,644 A * | 6/1995 | First, Sr. | A44B 11/14 24/68 CD |
| 5,516,246 A | 5/1996 | Helton | |
| 5,584,622 A * | 12/1996 | Dickerson, Sr. | B60P 3/075 410/10 |
| 5,688,011 A * | 11/1997 | Gulley | B66C 1/18 294/74 |
| 5,692,269 A | 12/1997 | Kamper | |
| 5,746,401 A | 5/1998 | Condo | |

(Continued)

*Primary Examiner* — David Upchurch (57) ABSTRACT

A securing strap having at least two strap securing interfaces that functions in combination with a ratcheting device. The strap has a first end, a second end, an inner surface, an outer surface, an upper edge, and a lower edge. The first end of the strap is looped around a strap attachment rod on the ratcheting device and extends back over a section of the strap allowing the two strap sections to be attached. At intervals along the two attached strap sections, attachment means are used to create openings, into which the at least two strap securing intervals and at least one strap securing member are inserted when securing an object. Once the strap is inserted through the ratcheting device, the two securing interfaces and the at least one securing member, the strap remains in place securing the object even if the ratcheting device fails.

17 Claims, 8 Drawing Sheets

(56) References Cited

U.S. PATENT DOCUMENTS

| | | | |
|---|---|---|---|
| 5,852,852 A | 12/1998 | Rigal | |
| 5,941,665 A * | 8/1999 | Dahlin | B60P 3/075 410/10 |
| 6,044,669 A | 4/2000 | Levi | |
| 6,637,077 B2 | 10/2003 | Doty | |
| 6,648,381 B2 * | 11/2003 | Holton | E05C 17/042 24/298 |
| 6,705,811 B1 * | 3/2004 | Selby | B60P 7/0823 410/100 |
| 7,207,089 B2 * | 4/2007 | Hanson | B60P 7/083 24/68 CD |
| 7,392,973 B1 | 7/2008 | Hsieh | |
| 7,585,197 B1 * | 9/2009 | Merten | B63C 9/26 182/136 |
| 7,861,382 B1 | 1/2011 | Madachy et al. | |
| 8,037,580 B2 | 10/2011 | Huang | |
| 8,182,182 B2 * | 5/2012 | Tardif | B60P 7/0807 410/100 |
| D661,175 S * | 6/2012 | Dahl | D8/349 |
| 8,209,821 B1 | 7/2012 | Chen | |
| D666,896 S * | 9/2012 | Pinholster, Jr. | D8/356 |
| 8,370,997 B2 | 2/2013 | Wright | |
| D681,411 S | 5/2013 | Qin et al. | |
| 8,459,914 B2 | 6/2013 | Tatina | |
| 8,505,683 B1 * | 8/2013 | Dirrig | A63B 27/00 182/9 |
| 8,511,951 B2 | 8/2013 | Yacucha | |
| 8,631,544 B1 | 1/2014 | Shotey et al. | |
| D703,898 S | 4/2014 | Neu et al. | |
| 8,746,769 B2 * | 6/2014 | Owen | A63C 11/021 224/917 |
| 8,763,209 B2 | 7/2014 | Kavarsky et al. | |
| 8,776,323 B2 * | 7/2014 | McLennan | B60P 7/0823 24/170 |
| D712,555 S * | 9/2014 | Berg | D24/190 |
| 9,003,579 B1 * | 4/2015 | Pinholster, Jr. | A45F 3/22 5/120 |
| D729,026 S | 5/2015 | Qin et al. | |
| 9,162,605 B2 * | 10/2015 | Durand | B60P 7/083 |
| 2003/0000047 A1 | 1/2003 | Mamie et al. | |
| 2004/0094650 A1 | 5/2004 | Huang | |
| 2004/0115020 A1 * | 6/2004 | Stanley | B61D 45/001 410/97 |
| 2005/0267518 A1 * | 12/2005 | Wright | A61B 17/132 606/203 |
| 2006/0179616 A1 | 8/2006 | Krause et al. | |
| 2006/0213941 A1 | 9/2006 | Sweeney | |
| 2007/0033772 A1 | 2/2007 | Brownlee et al. | |
| 2007/0122247 A1 | 5/2007 | Madachy et al. | |
| 2007/0125816 A1 | 6/2007 | Myers | |
| 2008/0110002 A1 * | 5/2008 | Calkin | A61G 3/0816 24/68 CD |
| 2008/0115335 A1 | 5/2008 | McCay | |
| 2008/0307618 A1 | 12/2008 | Huang | |
| 2009/0025185 A1 | 1/2009 | Banes | |
| 2009/0100653 A1 * | 4/2009 | Wang | B60P 7/083 24/68 CD |
| 2009/0119892 A1 * | 5/2009 | Breeden | B60P 7/083 24/68 CD |
| 2009/0169321 A1 * | 7/2009 | Flannigan | B60P 7/0807 410/101 |
| 2010/0071174 A1 | 3/2010 | Adcock | |
| 2010/0175233 A1 * | 7/2010 | Breeden | B60P 7/0846 24/68 CD |
| 2010/0180412 A1 | 7/2010 | Huang | |
| 2011/0041301 A1 | 2/2011 | Liang | |
| 2011/0167599 A1 | 7/2011 | Wright | |
| 2012/0110801 A1 | 5/2012 | Jouvert et al. | |
| 2012/0241545 A1 | 9/2012 | Borntrager | |
| 2012/0270706 A1 * | 10/2012 | Wu | A63B 7/02 482/91 |
| 2012/0279020 A1 | 11/2012 | Riedrich | |
| 2012/0282057 A1 | 11/2012 | Tatina | |
| 2013/0005544 A1 * | 1/2013 | Butler | A63B 21/4035 482/139 |
| 2013/0025098 A1 | 1/2013 | Smith | |
| 2013/0034401 A1 * | 2/2013 | Sauerwald | B60P 7/0876 410/101 |
| 2013/0104354 A1 * | 5/2013 | Miller | B60P 7/0823 24/68 CD |
| 2013/0333169 A1 | 12/2013 | Durand | |
| 2014/0259543 A1 * | 9/2014 | Scott | B65D 63/1027 24/16 PB |
| 2014/0261834 A1 * | 9/2014 | Philbert | B66C 1/14 138/106 |
| 2015/0136626 A1 | 5/2015 | Hagan et al. | |

* cited by examiner

SECURING STRAP HAVING AT LEAST ONE STRAP SECURING INTERFACE

TECHNICAL FIELD

The invention generally pertains to securing straps, and more particularly to a ratcheting strap having at least one additional securement interface.

BACKGROUND ART

There are many reasons for securing items, and ways to secure items. In some cases, items must be secured in place, either while the item is in use or during transportation. One of the most widely used devices for securing is a strap. Once an item has been placed at a desired location or in position, a strap is placed around the item and around another strong, stable, adjacent item. For example, cargo containers and boxes are often strapped to a truck for transportation. The strap will maintain a container or box in position and keep it from falling off the truck.

One of the benefits of a strap is as a result of a straps flexible nature, it can be wrapped around many types of items and used in many types of environments. Certain items or cargo must be especially secure during use or transportation. For items or cargo such as this, a ratcheting strap is typically utilized. A length of strap will have a ratcheting device on one end. Once an item or cargo is in place, the strap will be put around the item or cargo, and around an adjacent item. The strap end will then be inserted into the ratcheting device, which will pull the strap end through by the ratcheting motion, thereby providing a much tighter and stronger hold than could be accomplished by manually hand-pulling the strap. Once a strap is tightened and the item or cargo secure, the ratcheting device is locked, thus maintaining the tight hold of the strap.

Straps with ratcheting devices are very popular and widely used. There are some drawbacks though to using a ratcheting strap. One of the most significant drawbacks is that all of the high-tensioned strap securement is maintained by the ratcheting device. While ratcheting devices are manufactured to a high standard and are typically strong, robust devices, there is the possibility of malfunction or failure. When this occurs the results can often be devastating, and can include loss of life, injury and/or loss of the item or cargo.

The obvious solution to this problem would be to provide a back-up securement means for a ratcheting strap. Optimally, a back-up would be easy to use and be a part of the strap, as opposed to an external, add-on device. An additional securement means would not only add extra protection to an item or cargo, but could also potentially save lives and prevent injury.

A search of the prior art did not disclose any literature or patents that read directly on the claims of the instant invention. However, the following U.S. patents are considered related:

| PAT. NO. | INVENTOR | ISSUED |
| --- | --- | --- |
| 5,746,401 | Condon | 5 May 1998 |
| 6,637,077 | Doty | 28 Oct. 2003 |
| 2013/03333169 | Durand | 19 Dec. 2013 |

The U.S. Pat. No. 5,746,401 patent discloses a universal pipe hanger strap for hanging a pipe to a building structure comprising the strap has first and second ends and a plurality of ratchet teeth along at least the sides thereof. A ratchet buckle on the first end of the strap receives the second end of the strap, and latching pawls latchingly engaging the teeth. A universal attachment bracket is spaced intermediate the first and second ends.

The U.S. Pat. No. 6,637,077 patent discloses an adjustable strap having two loops of different lengths at each end, and a tensioning mechanism on the strap for adjusting the length and tension of the overall strap. S-hooks are placed on each of the short loops with an open but closable receiving hook positioned to hook the longer loop when the latter is routed back to the short loop. The short and long loops are configured to lie in parallel planes such that the strap may be used in a single loop configuration and have a flat side profile.

The 2013/03333169 publication application disclose a strap binder that includes a main frame and spool mounted for rotation inside the main frame. The spool has an outer surface and includes a first strap receiving passageway extending inside the pool between opposite first and second openings located on the outer surface of the spool, and a second straps-receiving passageway extending inside the pool from a third opening located on the outer surface of the spool to at least the first passageway. Also disclosed is a method of adjusting a strap in length and a ratchet strap binder including an elongated strap passing inside the at least one strap-receiving passageway.

For background purposes and indicative of the art to which the invention relates, reference may be made to the following remaining patents found in the patent search.

| PAT. NO. | INVENTOR | ISSUED |
| --- | --- | --- |
| D681,411 | Qin et al | 7 May 2013 |
| D703,898 | Neu et al | 29 Apr. 2014 |
| D729,026 | Qin et al | 12 May 2015 |
| 3,672,003 | Morgan | 27 Jun. 1972 |
| 4,252,158 | McDade | 24 Feb. 1981 |
| 5,271,606 | Kamper | 21 Dec. 1993 |
| 5,516,246 | Helton | 14 May 1996 |
| 5,692,269 | Kamper | 2 Dec. 1997 |
| 5,852,852 | Rigal | 29 Dec. 1998 |
| 6,044,669 | Levi | 4 Apr. 2000 |
| 7,392,973 | Hsieh | 1 Jul. 2008 |
| 7,861,382 | Madachy et al | 4 Jan. 2011 |
| 8,037,580 | Huang | 18 Oct. 2011 |
| 8,209,821 | Chen | 3 Jul. 2012 |
| 8,370,997 | Wright | 12 Feb. 2013 |
| 8,459,914 | Tatina | 11 Jun. 2013 |
| 8,511,951 | Yacucha | 20 Aug. 2013 |
| 8,631,544 | Shotey at al | 21 Jan. 2014 |
| 8,763,209 | Kavarsky et al | 1 Jul. 2014 |
| 2003/0000047 | Mamie et al | 2 Jan. 2003 |
| 2004/0094650 | Huang | 20 May 2004 |
| 2006/0179616 | Krause et al | 17 Aug. 2006 |
| 2006/0213941 | Sweeney | 28 Sep. 2006 |
| 2007/0033772 | Brownlee et al | 15 Feb. 2007 |
| 2007/0122247 | Madachy et al | 31 May 2007 |
| 2007/0125816 | Myers | 7 Jun. 2007 |
| 2008/0115335 | McCay | 22 May 2008 |
| 2008/0307618 | Huang | 18 Dec. 2008 |
| 2009/0025185 | Banes | 29 Jan. 2009 |
| 2010/0071174 | Adcock | 25 Mar. 2010 |
| 2010/0180412 | Huang | 22 Jul. 2010 |
| 2011/0041301 | Liang | 24 Feb. 2011 |
| 2011/0167599 | Wright | 14 Jul. 2011 |
| 2012/0110801 | Joubert et al | 10 May 2012 |
| 2012/0241545 | Borntrager | 27 Sep. 2012 |
| 2012/0279020 | Riedrich | 8 Nov. 2012 |
| 2012/0282057 | Tatina | 8 Nov. 2012 |

-continued

| PAT. NO. | INVENTOR | ISSUED |
|---|---|---|
| 2013/0025098 | Smith | 31 Jan. 2013 |
| 2015/0136626 | Hagan et al | 21 May 2015 |

DISCLOSURE OF THE INVENTION

In its preferred embodiment, the securing strap having at least two strap securing interfaces functions in combination with a ratcheting device and comprises a length of strap having a first end, a second end, an inner surface, an outer surface, an upper edge, and a lower edge.

The first end of the strap is looped around a strap securing rod on the ratcheting device, and extends back from the ratcheting device along a section of the strap. The two lengths of strap are attached together by attachment means that preferably are comprised of stitching. At intervals along the length of the two attached sections of strap are created openings that comprise two parallel attachment means with a space between the attachment means, thereby creating the openings from the space between each respective pair of attachment means.

Inserted through one of the openings is one of the strap securing interfaces. At least one more strap securing interface is inserted through another opening. Inserted through other openings is one of at least one strap securing member which preferably is comprised of a D-ring.

After said strap has been tightened, the second end of said strap is wrapped around the ratcheting device, into and through said strap securing interface, and then into and through said at least one strap securing member, wherein when multiple strap securing members are utilized, said securing strap is sequentially inserted into and through each member.

In view of the above disclosure, the primary object of the invention is to provide a securing strap having at least two strap securing interfaces that for a ratcheting device which is maintaining tension on a strap holding an object, in the event that the ratcheting device fails, the strap will remain in place securing the object.

In addition to the primary object of the invention it is also an object of the invention to provide a securing strap having at least two securing interfaces that:
  is easy to use,
  can be used secure many different types of objects having various dimensions,
  does not interface with the operation of a ratcheting device,
  can be used for stationary securement and securement of objects that are being transported,
  significantly lowers the risk involved when transporting objects,
  can be used on vehicles including trucks, ships and planes,
  can be used to secure a person,
  is long-lasting and durable, and
  is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms that disclose a preferred embodiment of a securing strap having at least one strap securing interface ("securing strap 10"). All of the embodiments of the securing strap 10 function in combination with a ratcheting device, and are often referred to as a ratcheting strap. In addition to a ratcheting device, the strap 10 can also be used with other devices such as a cam device. Securing straps which are also known as tie-down straps or latching straps, have long been used to maintain objects or cargo in a stationary location/position either at a fixed location such as in a warehouse, or during transportation such as on a truck, ship or airplane. Additionally, securing straps are utilized for other securement purposes by various industries or persons. For example, securing straps are utilized to maintain lighting trusses during entertainment productions, or even to secure an individual who performs a job/activity at an elevated location, such as an arborist or a telephone or power wire technician.

The use of a securing strap with a ratcheting device allows the strap to be quickly tightened around an object, cargo or person. The amount of tightening that a ratcheting device provides is significantly greater than a person could achieve by manually tightening a strap.

Ratcheting devices are typically well-made and durable, and are relied upon as being safe to use. Unfortunately, as with any mechanical device, a ratcheting device can fail especially after prolonged use. When a ratcheting device does fail the results can be serious, and can include loss of an object or cargo, or injury or even death to people.

The inventive securing strap 10, as shown in FIGS. 1-10, provides a solution to the problem of ratcheting device failure. And, as an extension of this purpose, the securing strap 10 also provides stronger securement when using a strap. This additional securement can provide greater peace of mind for individuals who are using or relying on a securing strap, as well as affecting insurance costs by lowering the inherent risk of using a strap.

Figure 1:
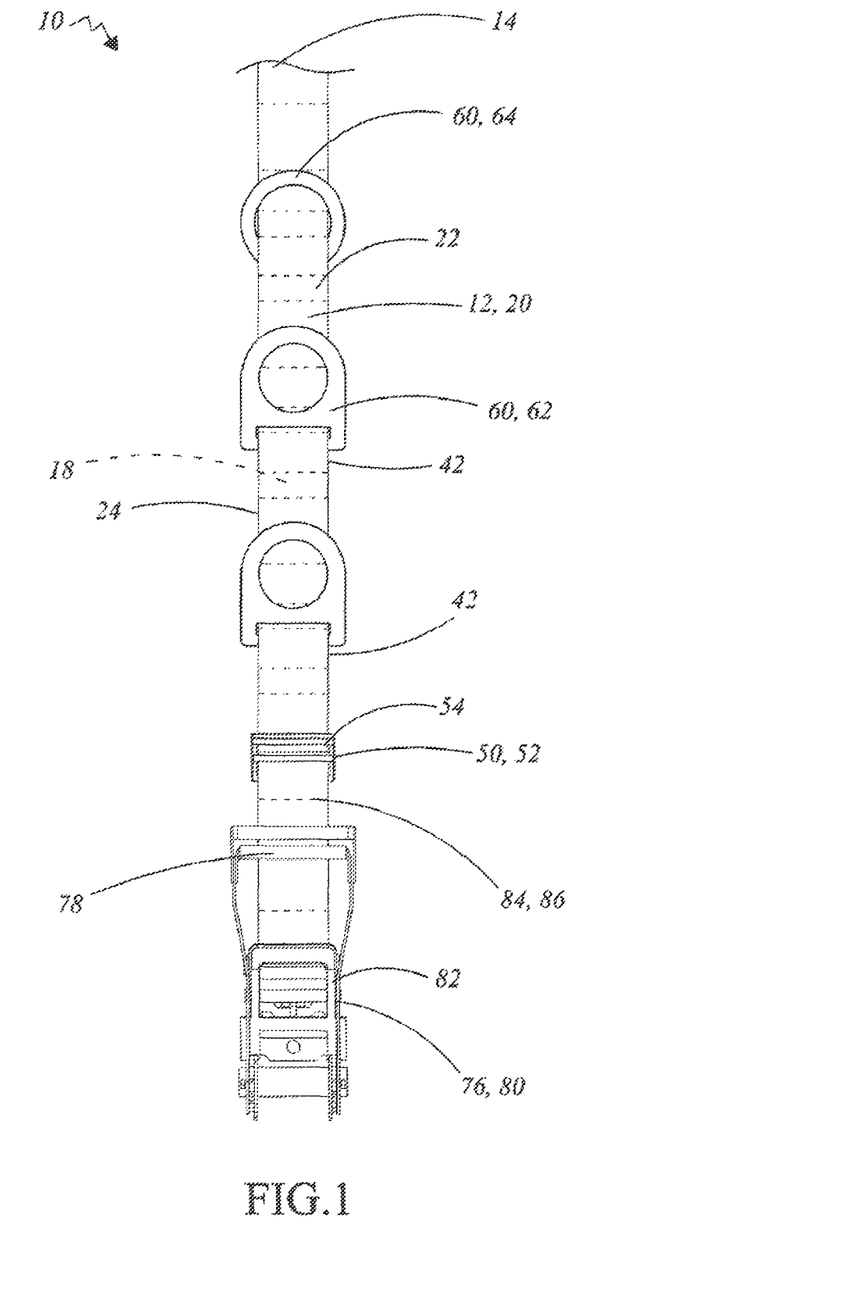
FIG. 1 is a front elevational view of a securing strap having at least one strap securing interface and at least one strap securing member.
Figure 2:
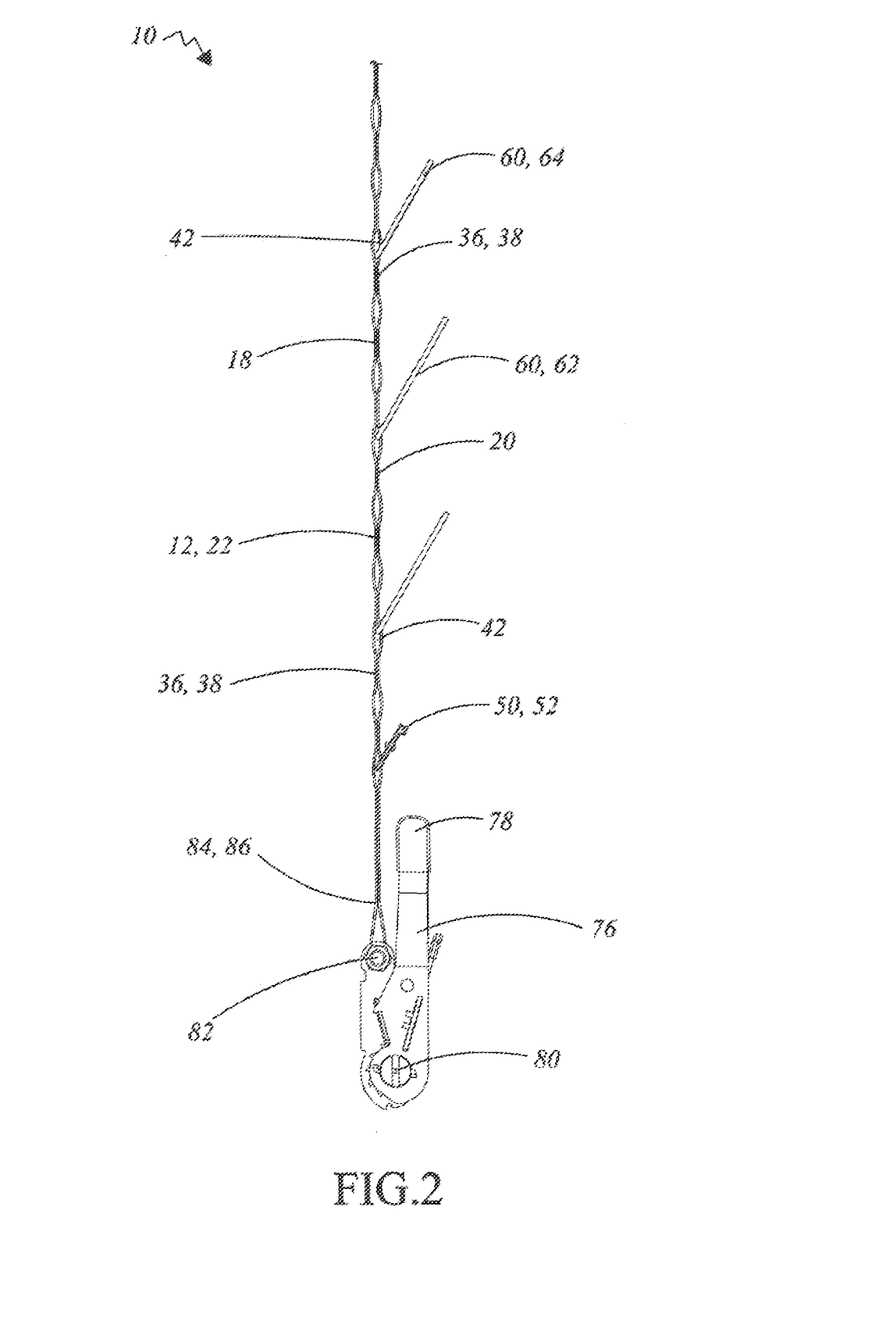
FIG. 2 is a top plan view of FIG. 1.

The first embodiment of the securing strap 10, as shown in FIGS. 1-2, functions in combination with a ratcheting device 76 having a grip 78 for tightening and releasing the strap, a ratchet mechanism 80 and a strap attachment rod 82. The securing strap 10 is comprised of a length of strap 12 having a first end 14, a second end 16, an inner surface 18, an outer surface 20, an upper edge 22 and a lower edge 24. The first end 14 of the strap 12 is looped around the strap attachment rod 82 on the ratcheting device 76, and extends back from the ratcheting device along a section of the strap 12. The two lengths of strap 12 are attached together by attachment means 36,84. At intervals along the length of the two attached straps, openings 42, which are known as pick points, are created that comprise two parallel attachment means with a space between the attachment means 36, thereby creating the openings 42 from the space between each respective pair of attachment means 36. Inserted through one opening 42 that is adjacent the ratcheting device 76 is one of at least one strap securing interface 50, and inserted through one of the openings is one of at least one strap securing member 60. Once the securing strap 10 is placed around an object, the strap is tightened by use of the ratcheting device 76 in a conventional manner. After the securing strap 10 has been tightened, the second end 16 of the strap 12 is wrapped around the ratcheting device 76, into and through the at least one strap securing interface 50, and then into and through the at least one strap securing member 60. When multiple strap securing members 60 are utilized, the strap 12 is sequentially inserted into and through each member 60. When securing an object, once the strap 12 is inserted through the ratcheting device 76, the at least one strap securing interface 50 and the at least one strap securing member 60, the securing strap 10 will remain in place securing the object even in the event that the ratcheting device fails.

Figure 3:
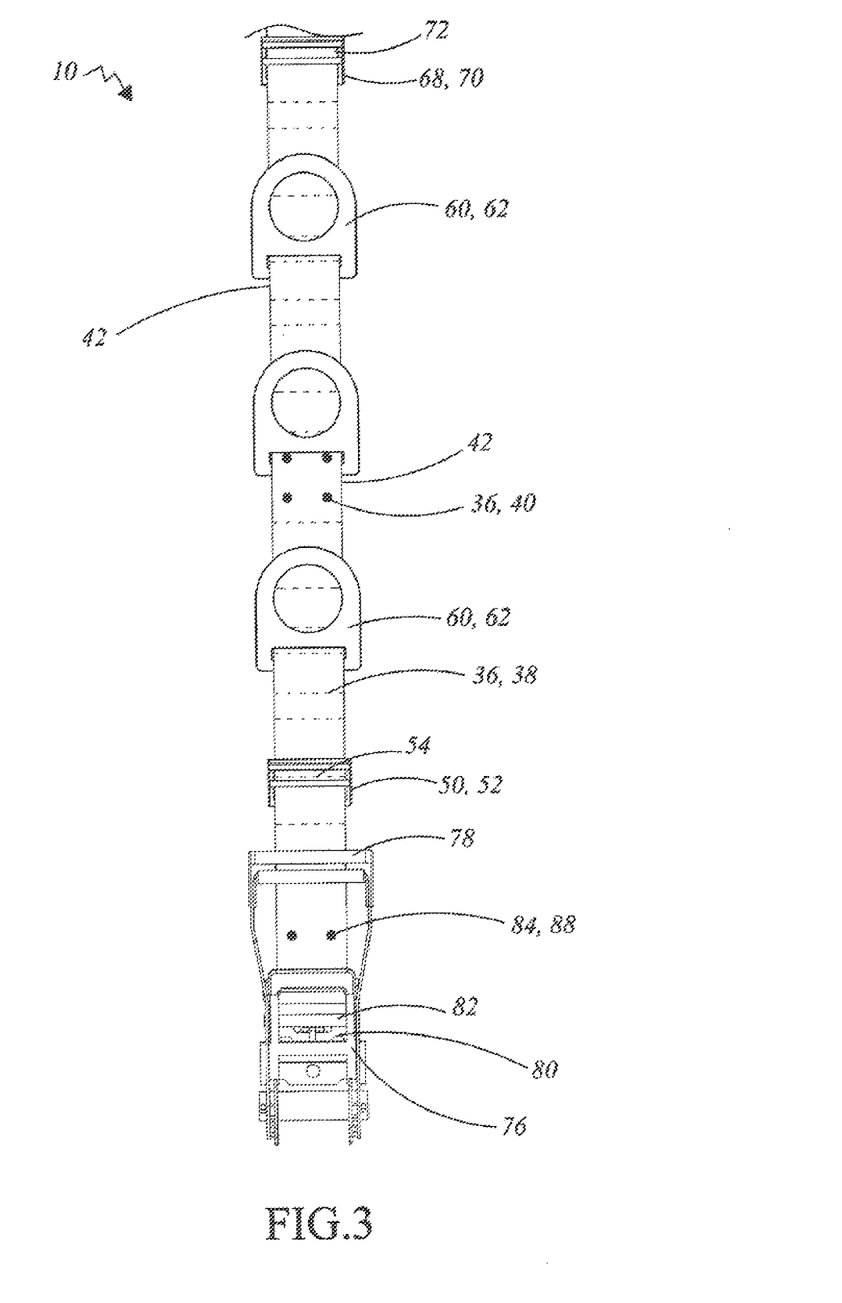
FIG. 3 is a front elevational view of a securing strap having at least two strap securing interfaces and at least one strap securing member.
Figure 4:
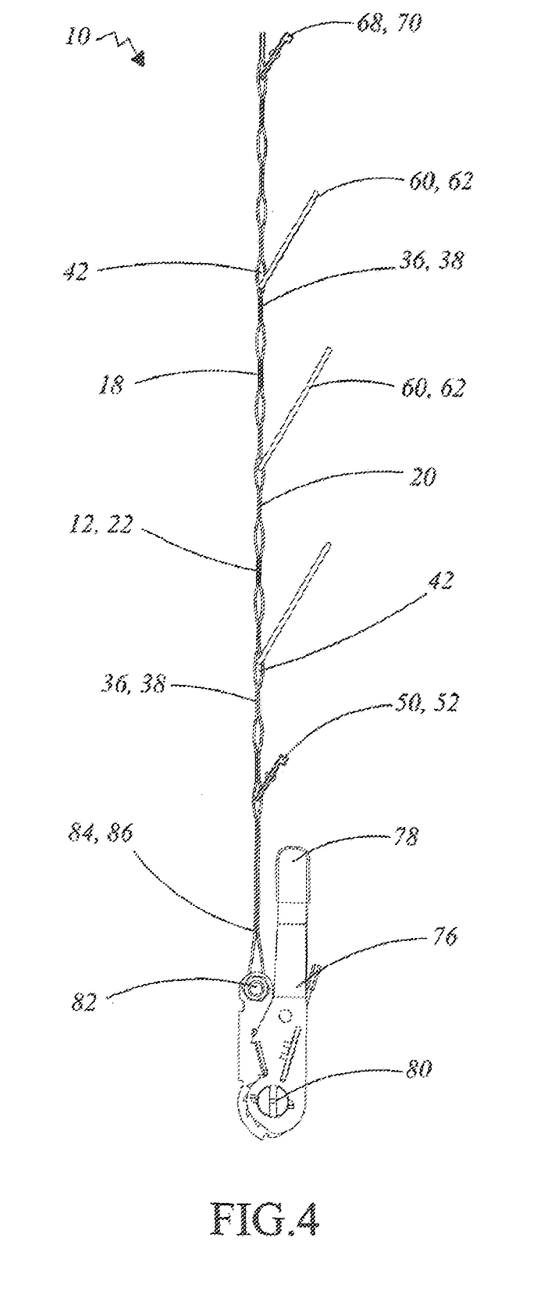
FIG. 4 is a top plan view of FIG. 3.

The second embodiment of the securing strap 10, which is the preferred embodiment and is shown in FIGS. 3-4, also functions in combination with a ratcheting device 76 having a grip 78 for tightening and releasing the strap 12, a ratchet mechanism 80 and a strap attachment rod 82. The securing strap 10 is comprised of a length of strap 12 having a first end 14, a second end 16, an inner surface 18, an outer surface 20, an upper edge 22 and a lower edge 24. The first end of the strap 12 is looped around the strap attachment rod 82 on the ratcheting device 76, and extends back from the ratcheting device 76 along a section of the strap 12. The two lengths of strap 12 are attached together by attachment means 84, wherein at intervals along the length of the two attached section of straps, attachment means 36 are utilized to create openings 42 that comprise two parallel attachment means 36 with a space between the attachment means 36, thereby creating the openings 42 from the space between each respective pair of attachment means 36. Inserted through one of the openings 42 that is adjacent the ratcheting device 76 is one of the at least two straps securing interfaces 50, and a second strap securing interface 68 is inserted through one of the openings 42 that is located at a distance from the ratcheting device 76. Inserted through one of the openings 42 that are located between the two strap securing interfaces 50,68 is at least one strap securing member 60. Once the securing strap 10 is placed around an object, the strap 12 is tightened by use of the ratcheting device 76 in a conventional manner. After the securing strap 10 has been tightened, the second end 16 of the strap 12 is wrapped around the ratcheting device 76, into and through the strap securing interfaces 50,68 and into and through the at least one strap securing member 60. When multiple strap securing members are utilized, the strap is sequentially inserted into and through each member. When securing an object, once the strap 12 is inserted through the ratcheting device 76, the at least two strap securing interfaces 50,68 and at least one strap securing member 60, the securing strap 10 will remain in place securing the object even in the event that the ratcheting device fails.

Figure 5:
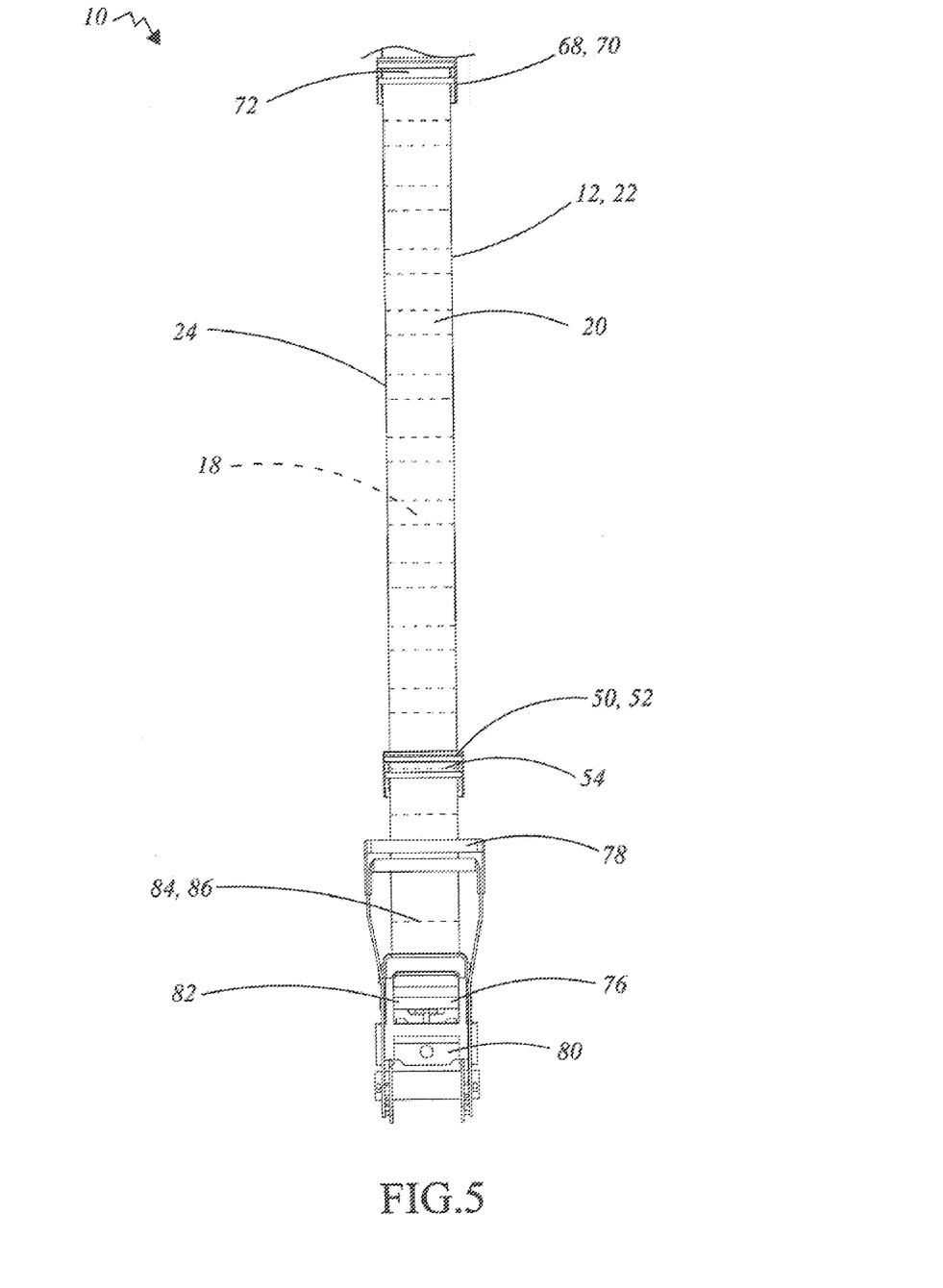
FIG. 5 is a front elevational view of a securing strap having at least two strap securing interfaces.
Figure 6:
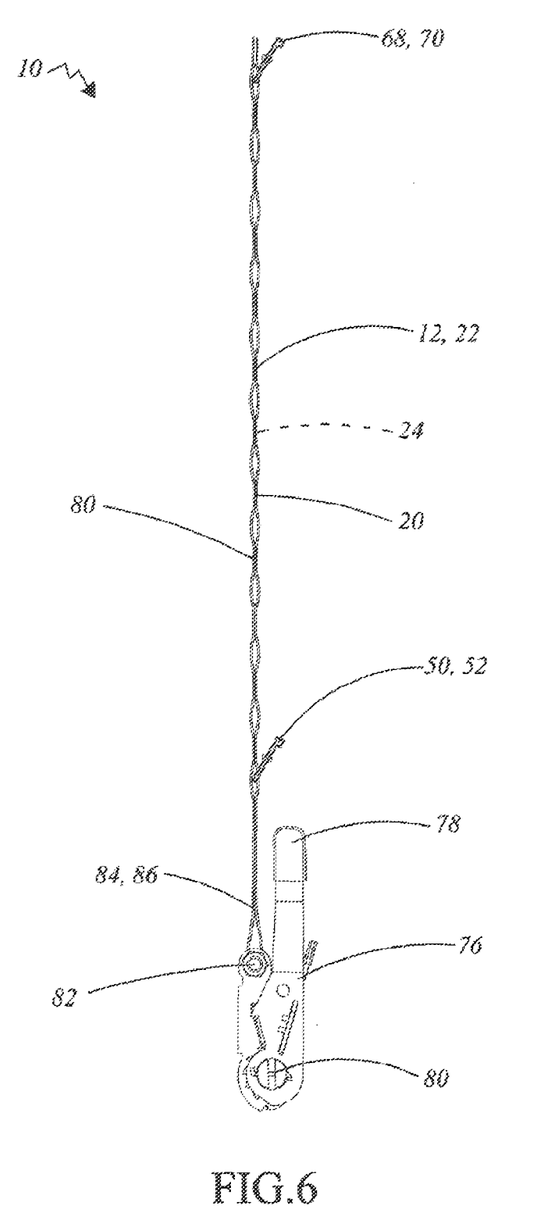
FIG. 6 is a top plan view of FIG. 5.

The third embodiment of the securing strap 10, as shown in FIGS. 5-6, also functions in combination with a ratcheting device 76 having a grip 78 for tightening and releasing the strap 12, a ratchet mechanism 80 and a strap attachment rod 82. The securing strap 10 is comprised of a length of strap 12 having a first end 14, a second end 16, an inner surface 18, an outer surface 20, an upper edge 22 and a lower edge 24. The first end 14 of the strap 12 is looped around the strap attachment rod 82 on the ratcheting device 76 and extends back from the ratcheting device along a section of the strap 12. The two lengths of strap 12 are attached together by attachment means 36,84. At two locations along the length of the two attached sections of straps, openings 42 are created that comprise two parallel attachment means 36 with a space between the attachment means, thereby creating the openings 42 from the space between each respective pair of attachment means 36. Inserted through one of the openings 42 that is adjacent the ratcheting device 76 is one of the at least two strap securing interfaces 50, and inserted through the second opening, which is located at a distance from the other opening, is the second strap securing interface 68. Once the securing strap 10 is placed around an object, the strap is tightened by use of the ratcheting device 76 in a conventional manner. After the securing strap 10 has been tightened, the second end 16 of the strap 12 is wrapped around the ratcheting device 76 and into and through the at least two strap securing interfaces 50,68. When securing an object, once the strap 12 is inserted through the ratcheting device and the at least two strap securing interfaces 50,68, the securing strap 10 will remain in place securing even in the event that the ratcheting device fails.

For all the embodiments, after the first end 14 of the strap 12 is wrapped around the strap attachment rod 82 on the ratcheting device 76, and extends along the strap 12, the two lengths of strap 12 are maintained together adjacent the ratcheting device 76 by the use of attachment means 84 comprising stitching 86, at least one rivet 88, an adhesive (not shown), or a nut and bolt combination (not shown), with stitching 86 preferred. Likewise, the attachment means 36 for attaching the two lengths of the strap 12 and for creating each of the at least one openings 42 is comprised of stitching 38, as shown in FIGS. 1-6, least one rivet 40, as shown in FIG. 3, an adhesive (not shown) or a nut and bolt combination (not shown), with stitching preferred. The strap can be made of various materials including nylon, fabric webbing, leather, rubber or plastic.

The strap securing interface(s) 50,68, as shown in FIGS. 1-10, are each preferably comprised of a clamping buckle 52,70 having a clamp 54,72 with a serrated or non-serrated edge. Additionally, the strap securing interface(s) 50,68 can be comprised of other types of clamping or locking devices such as a buckle. The requirement is that for whatever type of strap securing interface is utilized, the strap can be securely attached to the interface.

The strap securing member(s) are each comprised of preferably a D-ring 62, as shown in FIGS. 1-4, or a circular ring 64, as shown in FIG. 1. Other types/shapes of rings (or other devices) can also be utilized, as long as the strap 12 can be secured thereon.

Figure 7:
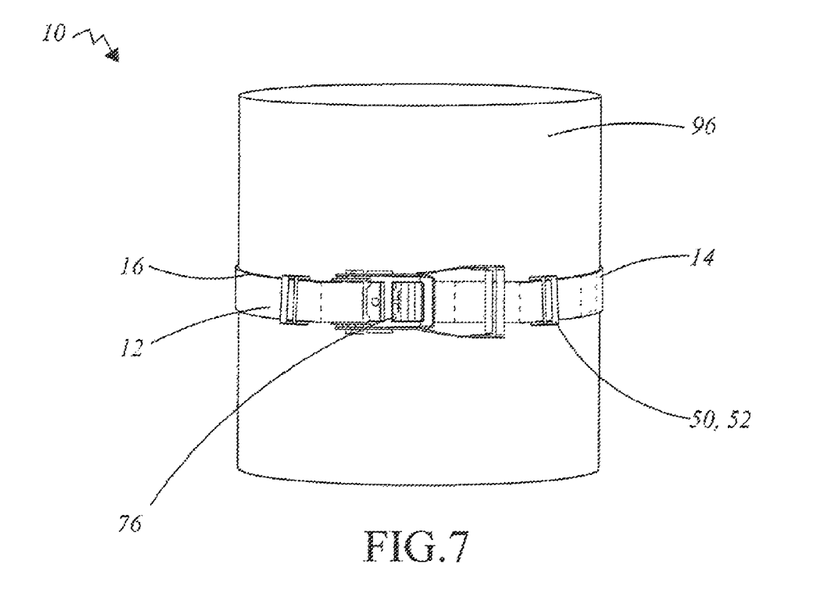
FIG. 7 is a front elevational view of the securing strap wrapped and tightened around a circular structure.
Figure 8:
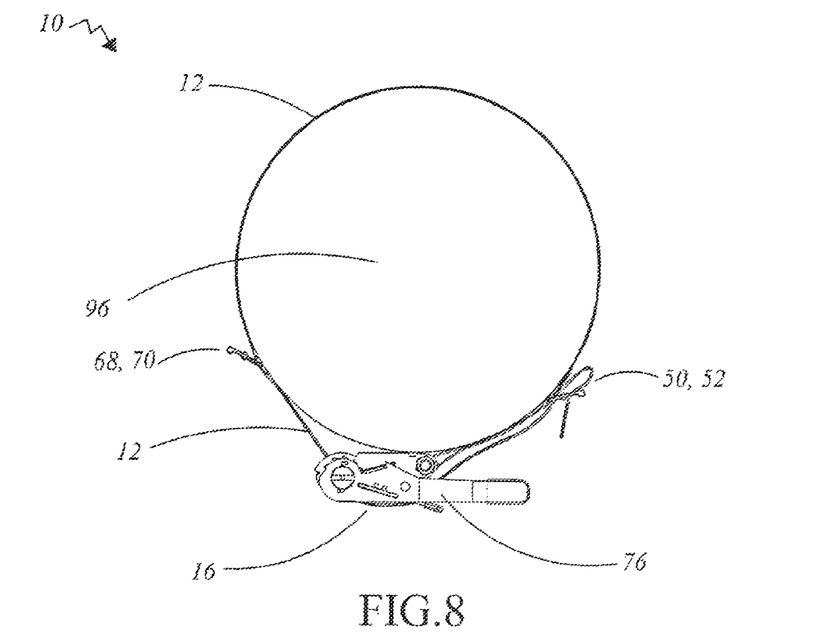
FIG. 8 is a top plan view of FIG. 7.
Figure 9:
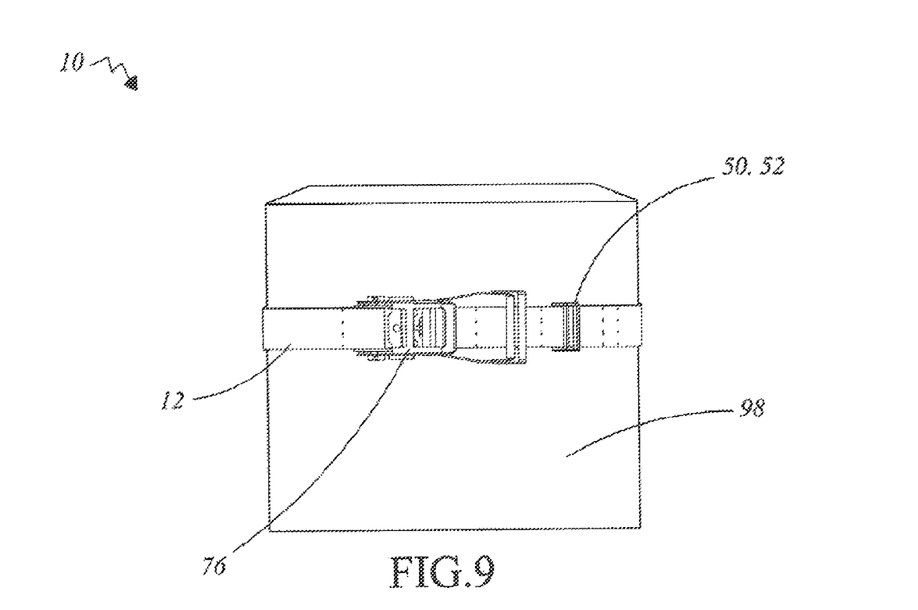
FIG. 9 is a front elevational view of the securing strap wrapped and tightened around a square structure.
Figure 10:
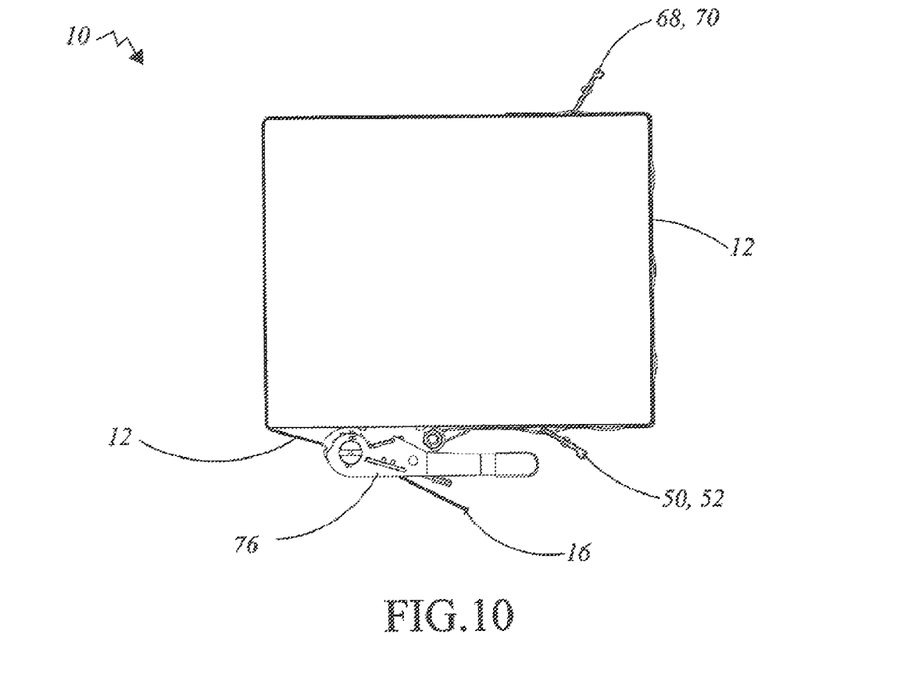
FIG. 10 is a top plan view of FIG. 9.

Any of the embodiments of the strap 20 can be used to secure a single object or multiple objects such as cargo. The dimensions of the object or cargo will typically determine the length and width, of the strap that is used. As a result of the flexibility of the strap 10, objects and cargo of various shapes can be secured. For example, a circular structure 96, such as a tree, as shown in FIGS. 7 and 8, or a square structure 98, such as a truss or shipping container, as shown in FIGS. 9 and 10.

It should be noted that while the strap 10 can be effectively utilized with only a single strap securing interface 50, as disclosed in the first embodiment it is highly preferable to use two strap securing interfaces 50,68 either with at least one strap securing member 60, as disclosed in the second embodiment, or no strap securing members 60, as disclosed in the third embodiment.

While the invention has been described in detail and pictorially shown in the accompanying drawings it is not to be limited to such details, since many changes and modification may be made to the invention without departing from the spirit and the scope thereof. Hence, it is described to cover any and all modifications and forms which may come within the language and scope of the claims.

The invention claimed is:

1. A securing strap having at least two strap securing interfaces, wherein said securing strap functions in combination with a ratcheting device, wherein said securing snap comprises a length of strap having a first end, a second end, an inner surface, an outer surface, an upper edge and a lower edge, wherein the first end of said strap is looped around a strap attachment rod on the ratcheting device, and extends hack from the ratcheting device along a section of said strap, wherein two lengths of said securing strap are attached together by attachment means, wherein at intervals along the two lengths of straps, attachment means are utilized to create openings that comprise two parallel attachment means with a space between the attachment means, thereby creating said openings from the space between each respective pair of attachment means, wherein inserted thrones one said opening is one of said at least two straps securing interfaces, and inserted through one opening is at least one, other of said at least two strap securing interfaces, wherein inserted through one said opening is at least one strap securing member, wherein once said securing, strap is placed around an object, said securing strap is tightened by use of the ratcheting device inn a conventional manner, wherein after said strap has been tightened, the second end of said strap is wrapped around the ratcheting device, into and through said at least one strap securing interfaces, and into and through said at least one strap securing member, wherein when multiple strap securing members are utilized, said strap is sequentially inserted into and through each member, wherein when securing an object, once said strap is inserted through the ratcheting device, said at least two strap securing interfaces and at least one strap securing member, said snap will remain in place securing the object even in the event that the ratcheting device fails.

2. The securing strap as specified in claim 1 wherein the ratcheting device comprises a grip for tightening and releasing said strap, a ratchet mechanism and the strap attachment rod.

3. The securing strap as specified in claim 1 wherein after the first end of said strap is wrapped around the strap attachment rod on the ratcheting device, and extends back along said strap, the two lengths of strap are attached together adjacent the ratcheting device by strap/ratchet attachment means.

4. The securing strap as specified in claim 3 wherein the strap/ratchet attachment means are comprised of stitching, or at least one rivet.

5. The securing strap as specified in claim 1 wherein said securing strap is made of a material selected from the group consisting of nylon, fabric webbing leather, rubber and plastic.

6. The securing strap as specified in claim 1 wherein the attachment means for attaching the two lengths of said securing strap, and for creating each of the at least one opening, are comprised of stitching, or at least one rivet.

7. The securing strap as specified in claim 1 wherein said at least two strap securing, interfaces are each comprised of a locking buckle having a clamp with a serrated or non-serrated edge.

8. The securing strap as specified in claim 1 wherein said at least one strap securing member is selected from the group consisting of a D-ring, a circular structure, and a geometric structure.

9. A securing strap having at least one strap securing interface, wherein said securing strap functions in combination with a ratcheting device, wherein said securing strap comprises a length of strap having a first end, a second end, an inner surface, an outer surface, an upper edge and a lower edge, wherein the first end of said securing strap is looped around a strap attachment rod on the ratcheting device and extends back from the ratcheting device along a section of said strap, wherein two lengths of said securing strap are attached together by attachment means, wherein at intervals along the two lengths of straps, openings are created that comprise two parallel attachment means with a space between the attachment means, thereby creating said openings from the space between each respective pair of attachment means, wherein inserted through one said opening is one of the at least two strap securing interfaces, and inserted through the second opening, which is located at a distance from the other opening, is an additional strap securing interface, wherein once said securing strap is placed around an object, said securing strap is tightened by use of the ratcheting device in a conventional manner, wherein after said strap has been tightened, the second end of said strap is wrapped around the ratcheting device and into and through said at least two strap securing interfaces, wherein when securing an object, once said strap is inserted through the ratcheting device and said at least two strap securing interfaces, said strap will remain in place securing the object even in the event that the ratcheting device fails.

10. The securing strap as specified in claim 9 wherein the ratcheting device comprises a grip for tightening and releasing said strap, a ratchet mechanism and the strap attachment rod.

11. The securing strap as specified in claim 9 wherein after the first end of said securing strap is wrapped around the strap attachment rod on the ratcheting device, and extends back along said strap, the two lengths of strap are attached together adjacent the ratcheting device by strap/ratchet attachment means.

12. The securing strap as specified in claim 11 wherein the strap/ratchet attachment means are comprised of stitching, or at least one rivet.

13. The securing strap as specified in claim 9 wherein said securing strap is made of a material selected from the group consisting of nylon, fabric webbing, leather, rubber and plastic.

14. The securing strap as specified in claim 9 wherein the attachment means for attaching the two, lengths of said securing strap, and for creating each of the at least one opening, are comprised of stitching, or at least one rivet.

15. The securing strap as specified in claim 9 wherein said at least two strap securing interfaces are each comprised of a locking buckle having a clamp with a serrated or non-serrated edge.

16. The securing strap as specified in claim 9 wherein said strap securing member is selected from the group consisting of a D-ring, a circular structure, and a geometric structure.

17. The securing strap as specified in claim 9 wherein the object that is secured has a geometric or non-geometric shape.

\* \* \* \* \*